United States Patent
Rakshit et al.

(10) Patent No.: US 10,600,390 B2
(45) Date of Patent: Mar. 24, 2020

(54) DISPLAYING A VEHICLE NOTIFICATION IN A LOCATION DETERMINED BASED ON DRIVER EYE GAZE DIRECTION AND OTHER CRITERIA

(71) Applicant: INTERNATIONAL BUSINESS MACHINES CORPORATION, Armonk, NY (US)

(72) Inventors: Sarbajit K. Rakshit, Kolkata (IN); Gregory J. Boss, Saginaw, MI (US); John E. Moore, Jr., Pflugerville, TX (US); Brent Hodges, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 15/866,958

(22) Filed: Jan. 10, 2018

(65) Prior Publication Data

US 2019/0213976 A1   Jul. 11, 2019

(51) Int. Cl.
*G09G 5/38* (2006.01)
*B60K 37/02* (2006.01)
(Continued)

(52) U.S. Cl.
CPC ............... *G09G 5/38* (2013.01); *B60K 35/00* (2013.01); *B60K 37/02* (2013.01); *B60K 37/06* (2013.01); *G02B 27/0101* (2013.01); *B60K 2370/149* (2019.05); *B60K 2370/15* (2019.05); *B60K 2370/1529* (2019.05); *B60K 2370/16* (2019.05);
(Continued)

(58) Field of Classification Search
CPC ............ G09G 5/38; G09G 2340/0464; G09G 2354/00; G09G 2380/10; B60K 37/02; B60K 2350/1056; B60K 2350/1076; B60K 2350/2052; B60K 2350/352; B60K 2350/96; G02B 27/0101; G02B 27/0093;
(Continued)

(56) References Cited

U.S. PATENT DOCUMENTS 7,835,834 B2   11/2010   Smith et al.
2008/0158096 A1*  7/2008   Breed ..................... B60N 2/002
                                                            345/7
(Continued)

FOREIGN PATENT DOCUMENTS

JP      4348663         10/2009
WO      2015025350      3/2017

OTHER PUBLICATIONS

Howard, "What are car surround view cameras, and why are they better than they need to be?", http://www.extremetech.com/extreme/186160-what-are-surround-view-cameras-and-why-are-they-better-than-they-need-to-be, Extreme Tech, Jul. 18, 2014, 7 pages.
(Continued)

*Primary Examiner* — Yu Chen
(74) *Attorney, Agent, or Firm* — Jay Wahlguist; Andrew D. Wright; Roberts Mlotkowski Safran Cole & Calderon, P.C.

(57) ABSTRACT

A computer-implemented method includes: monitoring, by a computing device, a driver's eye gaze direction; receiving, by the computing device, a notification; determining, by a computing device, a location to display the notification based on the driver's eye gaze direction; and generating, by the computing device, display instructions to display the notification in the determined location.

18 Claims, 8 Drawing Sheets

(51) Int. Cl.
  *G02B 27/01* (2006.01)
  *B60K 35/00* (2006.01)
  *B60K 37/06* (2006.01)
  *G08B 5/36* (2006.01)
  *G02B 27/00* (2006.01)

(52) U.S. Cl.
  CPC .. *B60K 2370/166* (2019.05); *B60K 2370/177* (2019.05); *B60K 2370/178* (2019.05); *B60K 2370/18* (2019.05); *B60K 2370/334* (2019.05); *B60K 2370/52* (2019.05); *G02B 27/0093* (2013.01); *G02B 2027/014* (2013.01); *G02B 2027/0138* (2013.01); *G02B 2027/0141* (2013.01); *G08B 5/36* (2013.01); *G09G 2340/0464* (2013.01); *G09G 2354/00* (2013.01); *G09G 2380/10* (2013.01)

(58) Field of Classification Search
  CPC .......... G02B 27/01; G02B 2027/0138; G02B 2027/014; G02B 2027/0141; G08B 5/36
  See application file for complete search history.

(56) References Cited

U.S. PATENT DOCUMENTS

| | | | | |
|---|---|---|---|---|
| 2010/0253542 | A1* | 10/2010 | Seder | G01S 7/22 340/932.2 |
| 2012/0224060 | A1 | 9/2012 | Gurevich et al. | |
| 2013/0265178 | A1* | 10/2013 | Tengler | H04W 4/00 340/989 |
| 2014/0281971 | A1* | 9/2014 | Isbell, III | G11B 27/034 715/716 |
| 2014/0310103 | A1* | 10/2014 | Ricci | B60Q 1/00 705/14.62 |
| 2015/0010207 | A1* | 1/2015 | Inada | B60K 35/00 382/103 |
| 2015/0061895 | A1* | 3/2015 | Ricci | G06F 16/25 340/902 |
| 2015/0319551 | A1* | 11/2015 | Grost | H04M 1/7253 455/414.1 |
| 2016/0085301 | A1* | 3/2016 | Lopez | G06F 3/013 345/156 |
| 2016/0110621 | A1* | 4/2016 | Tsimhoni | G06K 9/00845 382/104 |
| 2016/0189444 | A1* | 6/2016 | Madhok | G07C 5/02 701/36 |
| 2017/0352277 | A1* | 12/2017 | Lee | G08G 1/166 |
| 2018/0011313 | A1* | 1/2018 | Nahman | G02B 27/01 |
| 2018/0059780 | A1* | 3/2018 | Mitchell | G06F 3/013 |
| 2018/0086346 | A1* | 3/2018 | Fujisawa | B60Q 3/18 |
| 2018/0231772 | A1* | 8/2018 | Han | G02B 27/0101 |
| 2019/0235624 | A1* | 8/2019 | Goldberg | G02B 27/0093 |

OTHER PUBLICATIONS

Anonymous, "Wing mirror", Wikipedia, https://en.wikipedia.org/wiki/Wing_mirror, Accessed Oct. 17, 2017, 4 pages.

Anonymous, "Technology . . . or magic? Samsung shows off video of transparaent flexible screen—with 3D so real it looks like you can touch it", http://www.dailymail.co.uk/sciencetech/article-2070741/Samsungs-transparent-flexible-screen-3D-real-looks-like-touch-it.html, DailyMail.com, Dec. 7, 2011, 25 pages.

Mell et al., "The NIST Definition of Cloud Computing", NIST, Special Publication 800-145, Sep. 2011, 7 pages.

* cited by examiner an embodiment of the present invention.

DISPLAYING A VEHICLE NOTIFICATION IN A LOCATION DETERMINED BASED ON DRIVER EYE GAZE DIRECTION AND OTHER CRITERIA

BACKGROUND

The present invention generally relates to displaying a vehicle notification within a vehicle display system, and, more particularly, to displaying a vehicle notification in a location determined based on driver eye gaze direction and other criteria.

While driving a vehicle, a driver's attention is focused on the road, other vehicles, obstacles, signs and other driving conditions. Periodically, the driver's focus and attention is directed back and forth from elements in the road to the vehicle's dashboard and information display screen (e.g., in order to view a vehicle alert or notification, navigation directions, etc.). Each time an individual's focal plane changes, their eyes need as much as a second (typically between 700 and 1,400 milliseconds) to accommodate and stabilize to that new distance. This delay could result in driver distraction and contribute to the likelihood of more accidents. In addition to accommodation and stabilization, the driver's need to redirect focus from the road to the dashboard adds more delay.

SUMMARY

In an aspect of the invention, a computer-implemented method includes: monitoring, by a computing device, a driver's eye gaze direction; receiving, by the computing device, a notification; determining, by a computing device, a location to display the notification based on the driver's eye gaze direction; and generating, by the computing device, display instructions to display the notification in the determined location.

In an aspect of the invention, there is a computer program product for displaying a vehicle notification in a location determined based on driver eye gaze direction. The computer program product comprises a computer readable storage medium having program instructions embodied therewith, the program instructions executable by a computing device to cause the computing device to: monitor a driver's eye gaze direction; receive the vehicle notification; determine a diversion time for the driver to review the vehicle notification; determine a location to display the notification based on the driver's eye gaze direction and the diversion time; and display the notification in the determined location.

In an aspect of the invention, a system includes: a CPU, a computer readable memory and a computer readable storage medium associated with a computing device; program instructions to monitor a driver's eye gaze direction; program instructions to determine a focal point of the driver based on the eye gaze direction; program instructions to receive a vehicle notification; program instructions to determine a diversion time for the driver to review the vehicle notification; program instructions to determine a location to display the notification based on the driver's eye gaze direction and the diversion time; and program instructions to display the notification in the determined location. The program instructions are stored on the computer readable storage medium for execution by the CPU via the computer readable memory

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
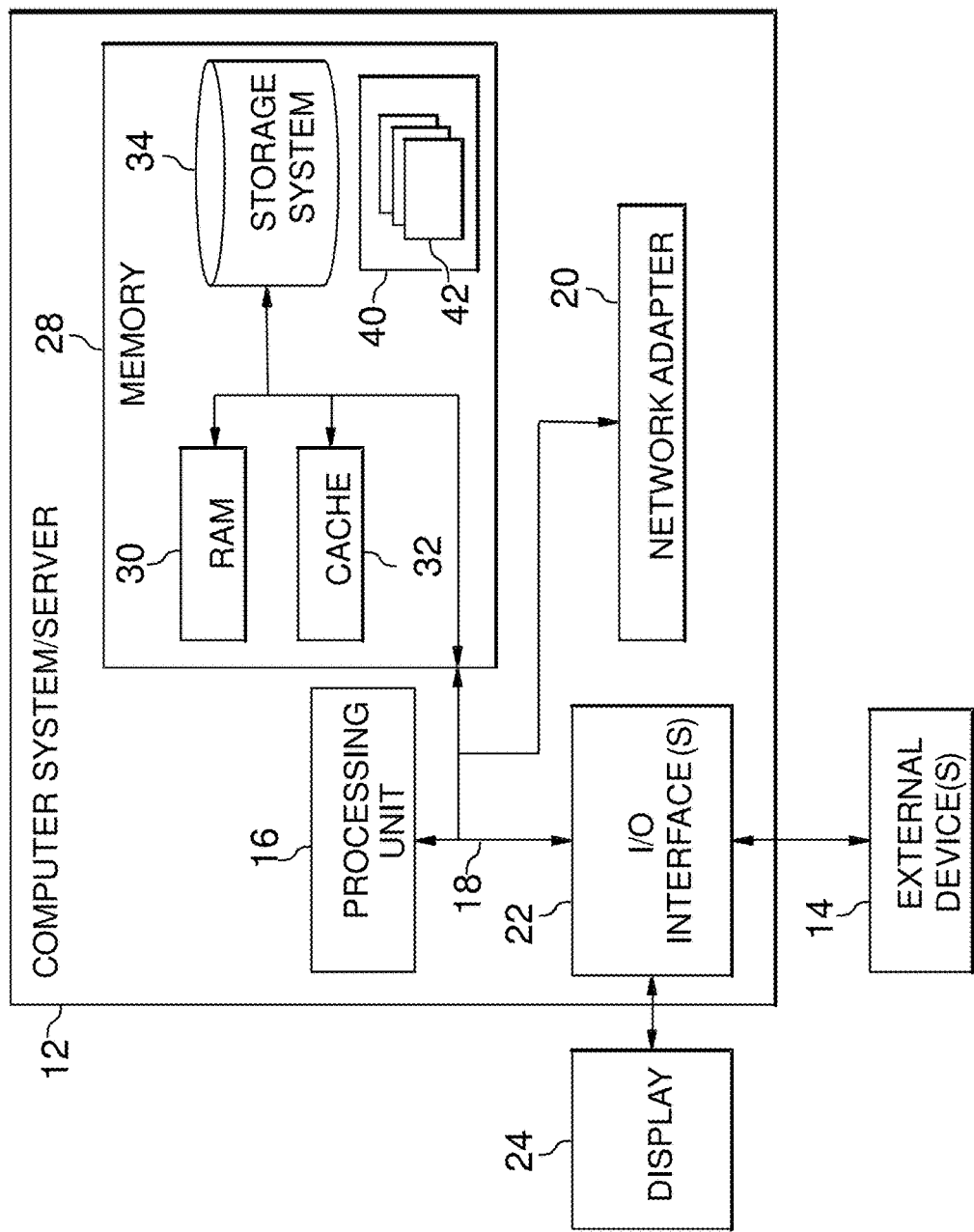
FIG. 1 depicts a cloud computing node according to an embodiment of the present invention.

The present invention generally relates to displaying a vehicle notification within a vehicle display system, and, more particularly, to displaying a notification alert in a location determined based on driver eye gaze direction and other criteria. When driving a vehicle, a vehicle system may provide an alert or notification to the driver (e.g., an alert relating to a vehicle malfunction, navigation directions, incoming texts messages or phone calls, and/or other types of alerts and notifications). Viewing of an alert by a driver may cause delays in a driver refocusing focal planes when directing their focus back and forth between the road and vehicle elements (e.g., heads-up displays, navigation systems, vehicle information displays, etc.). These delays in refocusing between the road and a display showing an alert could result in driver distraction and contribute to the likelihood of more accidents. Accordingly, aspects of the present invention display vehicle notifications in the focus plane of the driver as the driver focuses on the road. For example, aspects of the present invention may display a notification through a heads-up display device of the vehicle in which the notification is projected onto the vehicle's windshield in which the location of the projected notification is based on the eye gaze direction and focal plane of the driver. In this way, the degree to which the driver may need to look away from the road and their current focal plane is minimized, thus minimizing the time for the driver to refocus on the road.

As described herein, aspects of the present invention may determine and monitor the eye gaze of the driver using one or more onboard cameras, visual analysis, and/or other devices and techniques. Based on the driver's eye gaze direction, the driver's focal plane may be determined. When an event occurs that triggers a notification, aspects of the present invention may determine an estimated diversion time (e.g., gaze-time or focus delay time) to view the notification, and a location to display the notification (e.g., within a dashboard display and/or within the driver's focal plane on the windshield through the vehicle's heads-up display system).

As described herein, aspects of the present invention may determine the location to display the notification based on the driver's focal plane and eye gaze direction, and also further based on other criteria. For example, aspects of the present invention may determine the location to display the notification based on a score that indicates the importance of the notification, and/or a score that indicates the diversion time (e.g., focus delay or gaze-time) of the notification. Additionally, or alternatively, the location to display the notification may be based on driver information, driver preferences, driver accident history, driver reaction time information, driver vision health information, etc. Additionally, or alternatively, the location to display the notification may be based on the type of notification, current road conditions, vehicle conditions, driver action required to act on the notification, etc. Also, aspects of the present invention may determine a time for when to display a notification (e.g., less severe notifications may not be displayed until the vehicle is stopped). In embodiments, aspects of the present invention may determine (e.g., based on the criteria) whether a notification should be displayed through a heads-up display (and the location in the display), or if the notifications should be displayed through a different type of display (e.g., a dashboard display, infotainment display, etc.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
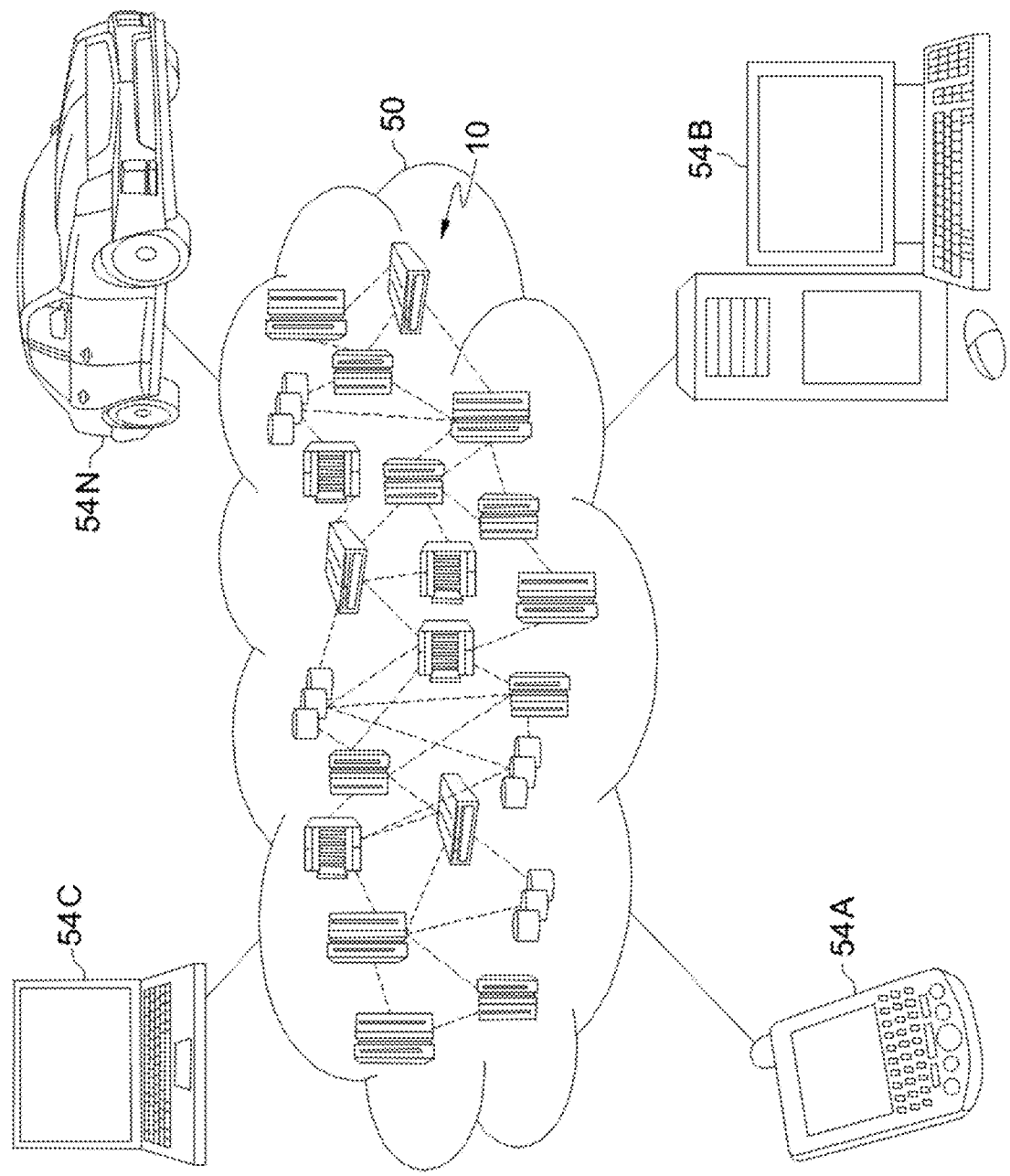
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
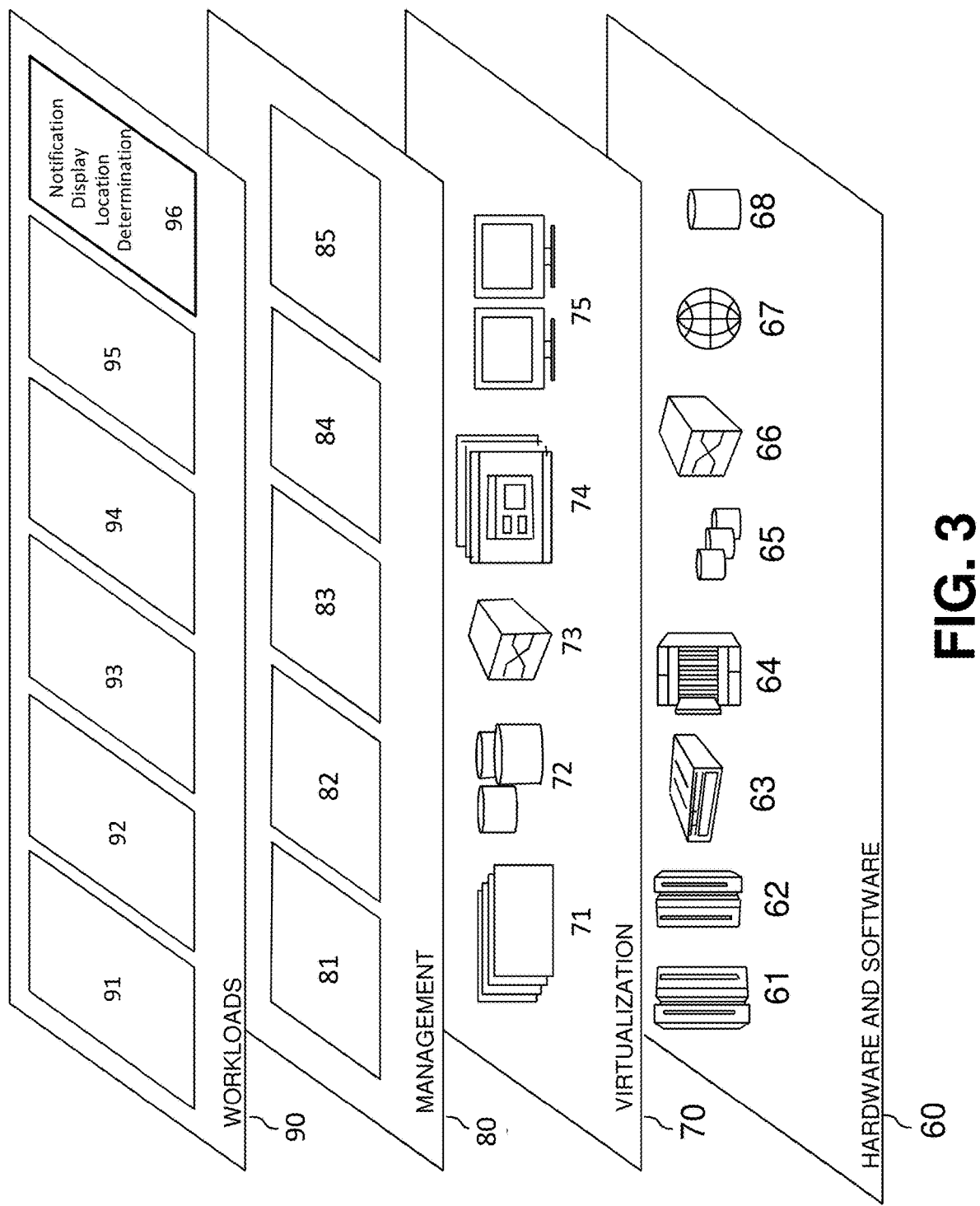
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification display location determination 96.

Figure 5:
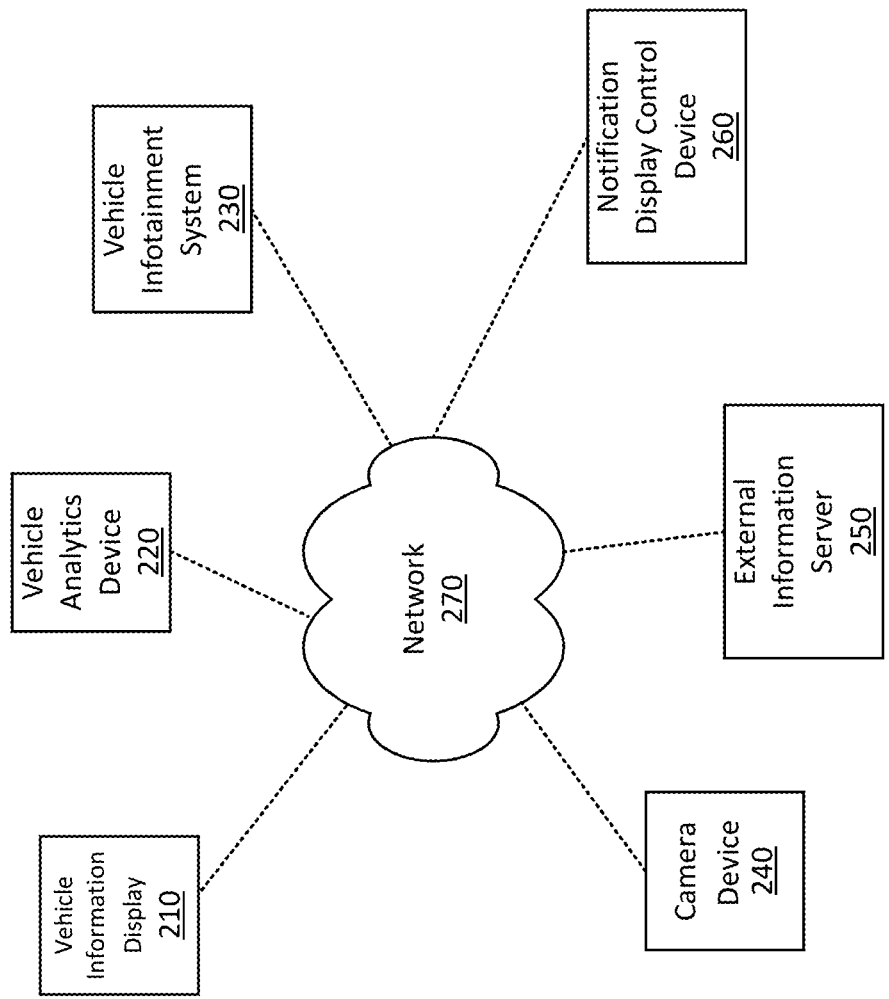
FIG. 5 shows an example environment in accordance with aspects of the present invention.

Referring back to FIG. 1, the program/utility 40 may include one or more program modules 42 that generally carry out the functions and/or methodologies of embodiments of the invention as described herein (e.g., such as the functionality provided by notification display location determination 96). Specifically, the program modules 42 may monitor camera data for driver eye gaze direction, determine focus plane, monitor vehicle analytics information, receive a vehicle notification, score the vehicle notification, and determine a location to display the vehicle notification. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an external information server 250 as shown in FIG. 5.

Figure 4A:
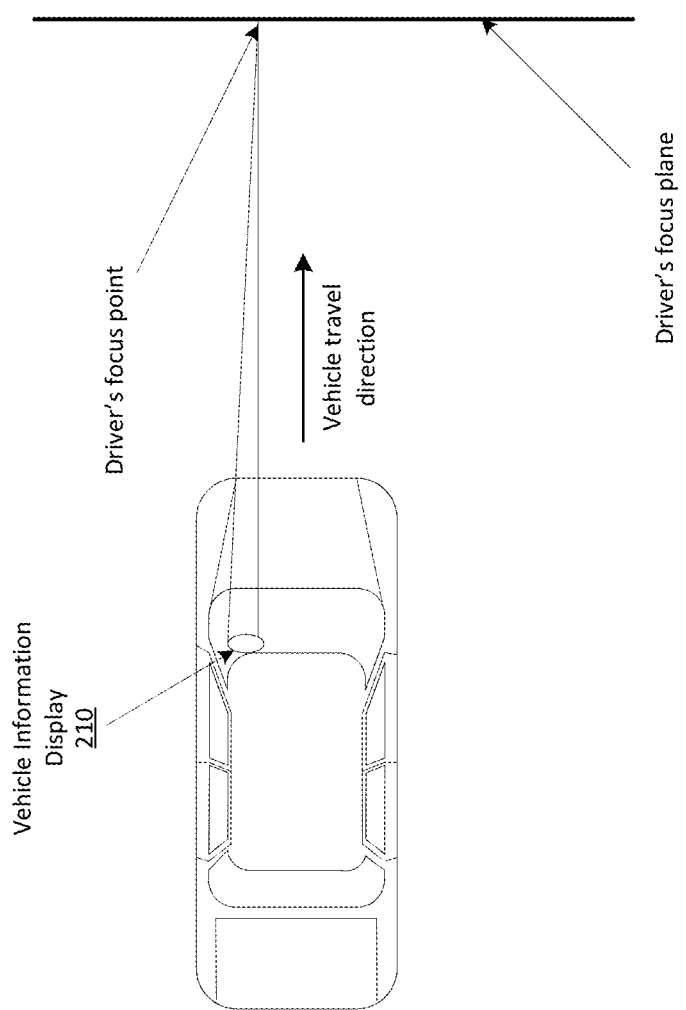
FIGS. 4A and 4B show an overview of an example implementation in accordance with aspects of the present invention
Figure 4B:
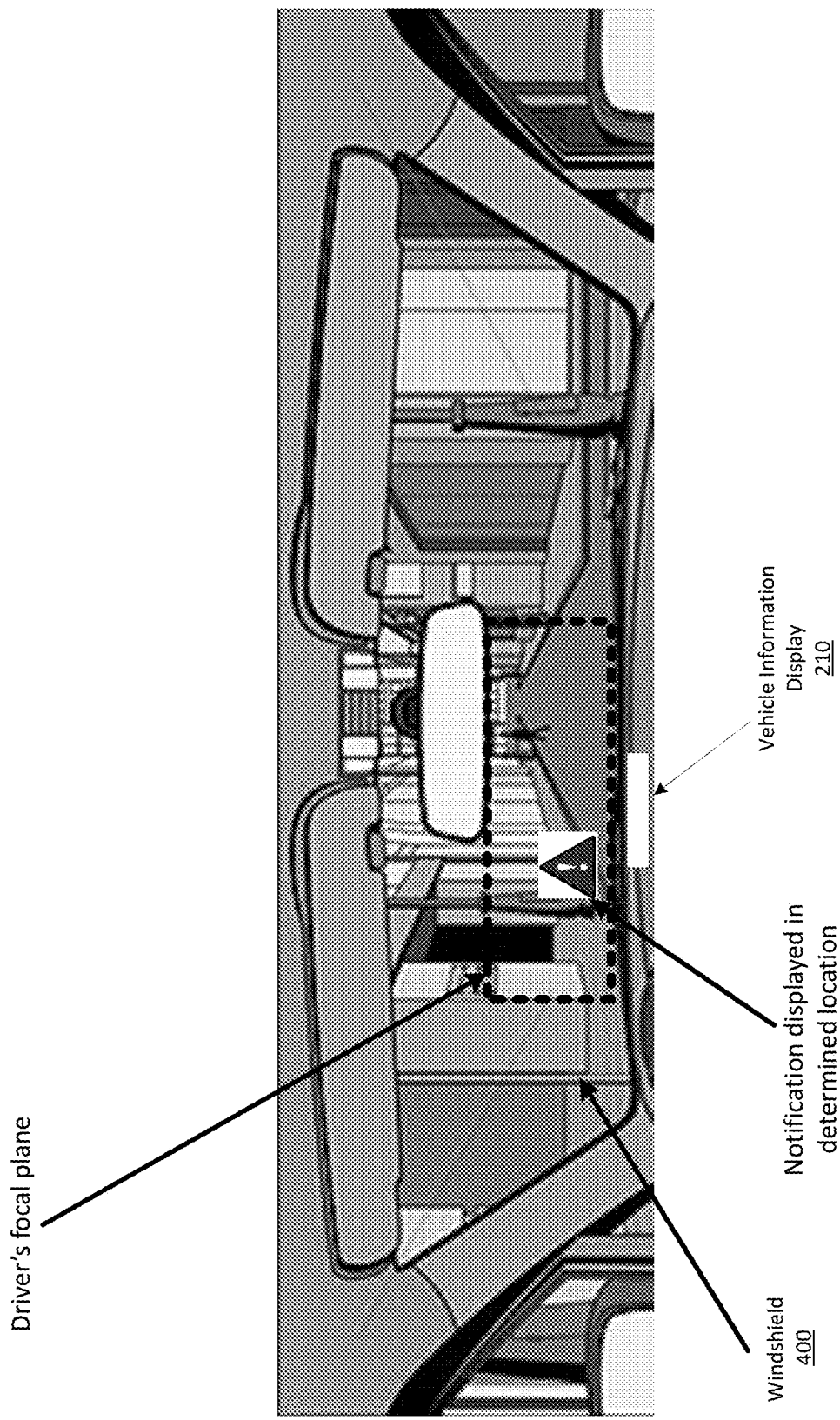

FIGS. 4A and 4B show an overview of an example implementation in accordance with aspects of the present invention. As shown in FIG. 4A, a vehicle may include a vehicle information display 210 (e.g., a heads-up display or similar type of device). In embodiments, the driver's focus point may be determined based on the driver's eye gaze direction that is determined using one or more on board camera devices and visual analysis of the driver's eyes. Based on the driver's focus point and the vehicle travel direction, the driver's focus plane may be determined.

Referring to FIG. 4B, a notification may be displayed through the vehicle information display 210 (e.g., projected on the vehicle's windshield 400 in a location that is based on the driver's eye gaze direction and focal plane). As described herein, the location of the notification may be such that the degree to which the driver has to adjust their vision is relatively small. In other words, the location of the notification may be within a threshold distance of the driver's focal point within the focal plane. Further, the location of the notification may be such that the notification does not obstruct the driver's view of the road. For example, the notification may be located offset from the focal point of the driver. In embodiments, the location of the notification can be determined based on a variety of other criteria, in addition to the driver's eye gaze direction, focal plane, and/or focal point. For example, the notification location may be based on the type of notification, the importance of the notification, the amount of time to view the notification, the vehicle conditions (e.g., current speed, turn signal status, etc.), driver preferences, environmental/weather conditions, etc.

In embodiments, the notification location may be dynamic based on changing conditions and changing importance levels. For example, the location notification may be closer to the driver's focal point when the vehicle is stopped, but may move away when the vehicle begins to move. Additionally, or alternatively, the importance of the notification may change over time, thus changing the location of the notification. For example, more important notifications that require more immediate attention may be located relatively closer to the driver's focal point (e.g., notifications regarding an imminent vehicle malfunction, notifications regarding navigation instructions to make an upcoming turn, etc.). In embodiments, notifications can be presented in different colors, with different animations (e.g., entry/exit animations, blinking, etc.) based on various customizable criteria. As described herein, some notifications may not be displayed at all until the vehicle is stopped (e.g., for less important notifications not requiring immediate attention). In embodiments, some notifications may be displayed in other displays in the vehicle, other than the vehicle's heads-up display (e.g., within an infotainment center display, a dashboard display, etc.). In embodiments, notifications that may originally appear in a dashboard display may be transferred or duplicated through the heads-up display (e.g., when the importance of the notification becomes such that more immediate attention is required).

FIG. 5 shows an example environment in accordance with aspects of the present invention. As shown in FIG. 5, environment 500 may include a vehicle information display 210, a vehicle analytics device 220, a vehicle infotainment system 230, one or more camera devices 240, an external information server 250, a notification display control device 260, and a network 270. In embodiments, one or more components in environment 500 may correspond to one or more components in the cloud computing environment of FIG. 2. In embodiments, one or more components in environment 500 may include the components of computer system/server 12 of FIG. 1.

The vehicle information display 210 may include one or more displays within a vehicle, such as a heads-up display, an infotainment display, navigation system display, dashboard display, or the like. The vehicle information display 210 may receive display instructions from the external information server 250 to display a notification in a particular manner (e.g., in a particular location, with certain animations, colors, etc.).

The vehicle analytics device 220 may include one or more computing devices (e.g., such as computer system/server 12 of FIG. 1) that tracks vehicle data, such as vehicle speed, vehicle health/maintenance status, etc. In embodiments, the vehicle analytics device 220 may generate a notification (e.g., relating to vehicle analytics/vehicle maintenance) for display to the driver. As described herein, the vehicle analytics data may be used by the notification display control device 260 as criteria for determining the notification position of a notification.

The vehicle infotainment system 230 may include one or more computing devices (e.g., such as computer system/server 12 of FIG. 1) that hosts applications, such as navigation applications, entertainment applications, telephone and text messaging applications, etc. The vehicle infotainment system 230 may present applications on a vehicle information display 210, and may provide notifications relating to navigation directions, incoming phone calls/text messages, etc.

The camera device 240 may include one or image capturing devices that may be placed in a position that captures images of the driver's eye gaze direction. In embodiments, the notification display control device 260 may use the image data captured by the camera device 240 to determine eye gaze direction/angle, focal point, and focal plane.

The external information server 250 may include one or more computing devices (e.g., such as computer system/server 12 of FIG. 1) that stores driver information and/or other external information regarding roadways, events, etc. The information stored by the external information server 250 may be used by the notification display control device 260 to determine the display location of notifications based on criteria.

The notification display control device 260 may include one or more computing devices (e.g., such as computer system/server 12 of FIG. 1) that determines the display location of a notification based on at least one of: driver eye gaze direction (as determined from image data provided by the camera device 240), vehicle analytics data, notification type, notification importance, driver information, external information, expected diversion time, notification content, environmental conditions, road conditions, etc. In embodiments, the notification display control device 260 may generate a score for the notification indicating its importance, and may use the score as part of determining the location for the display. As described herein, the notification display control device 260 may determine that a notification should be displayed through a vehicle information display 210 (e.g., a heads-up display, infotainment display, dashboard display, etc.). Further, the notification display control device 260 may determine the viewing/projection location for the notification on a windshield through the heads-up display.

The network 270 may include network nodes, such as network nodes 10 of FIG. 2. Additionally, or alternatively, the network 270 may include one or more wired and/or wireless networks. For example, the network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 270 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
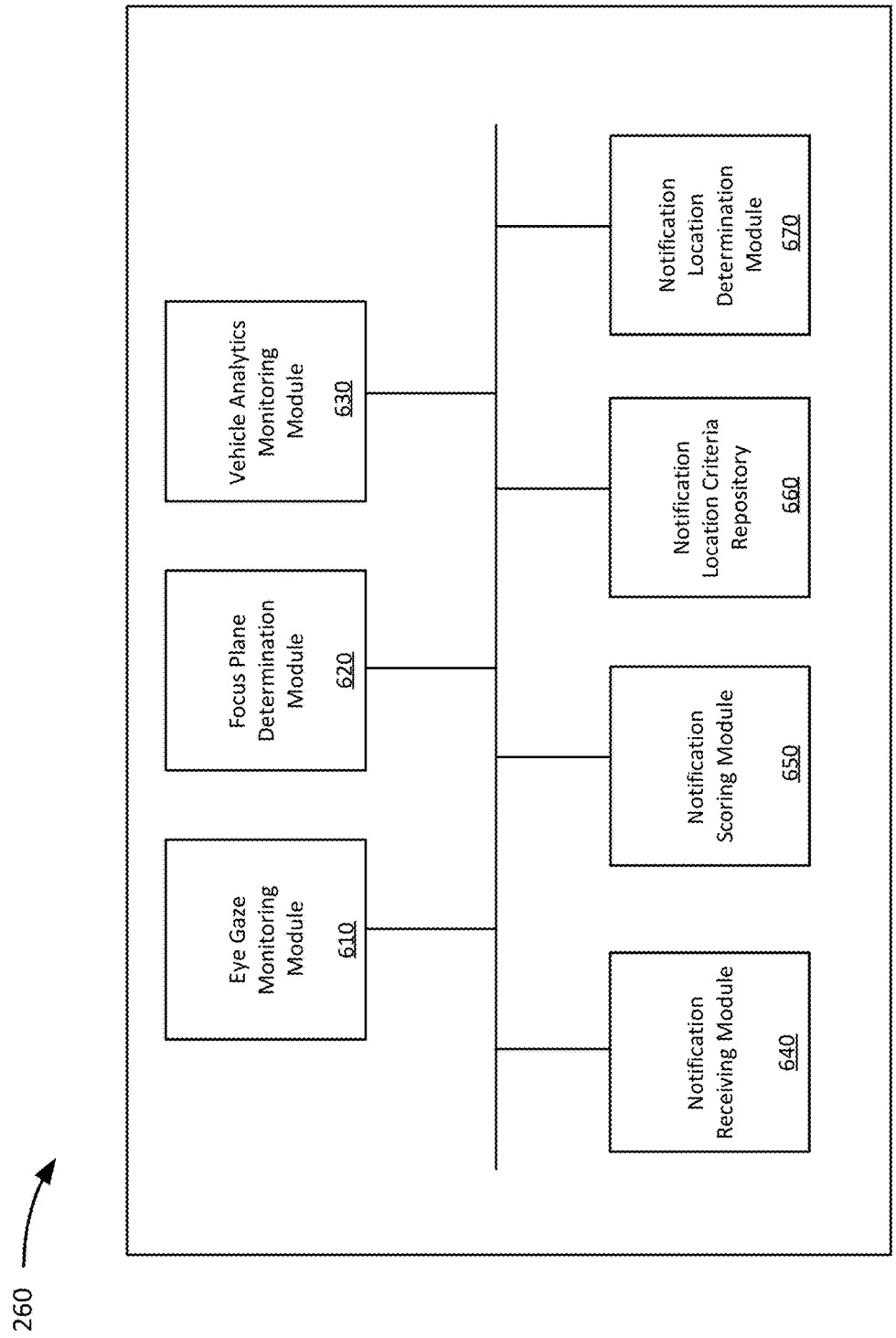
FIG. 6 shows a block diagram of example components of a notification display control device in accordance with aspects of the present invention.

FIG. 6 shows a block diagram of example components of a notification display control device in accordance with aspects of the present invention. As shown in FIG. 6, the notification display control device 260 may include an eye gaze monitoring module 610, a focus plane determination module 620, a vehicle analytics monitoring module 630, a notification receiving module 640, a notification scoring module 650, a notification location criteria repository 660, and a notification location determination module 670. In embodiments, the notification display control device 260 may include additional or fewer components than those shown in FIG. 6. In embodiments, separate components may be integrated into a single computing component or module. Additionally, or alternatively, a single component may be implemented as multiple computing components or modules.

The eye gaze monitoring module 610 may include a program module (e.g., program module 42 of FIG. 1) that monitors a driver's eye gaze direction and angle based on image data received from one or more camera devices 240. In embodiments, the eye gaze monitoring module 610 may implement image analysis techniques to recognize the driver's eyes and the direction and angle of their eye gaze. From the eye gaze direction and angle, the eye gaze monitoring module 610 may determine a focal point by mapping the direction and angle to a viewing plane.

The focus plane determination module 620 may include a program module (e.g., program module 42 of FIG. 1) that determines the focus plane of a driver. In embodiments, the focus plane determination module 620 may determine the focus plane based on the driver's eye gaze direction, angle, and focal point. In embodiments, the focal plane may be an area that surrounds the focal point and is within the driver's field of vision. The size and shape of the area and the focal plane may be based on known medical data of average vision, or may be based on the driver's own vision medical records.

The vehicle analytics monitoring module 630 may include a program module (e.g., program module 42 of FIG. 1) that monitors vehicle analytics data based on data received from the vehicle analytics device 220. For example, the vehicle analytics monitoring module 630 may monitor vehicle analytics data, such as vehicle speed, braking activity, turn signal activity, steering activity, vehicle maintenance status, etc.

The notification receiving module 640 may include a program module (e.g., program module 42 of FIG. 1) that receives notifications for display on a vehicle information display 210. For example, the notification receiving module 640 may receive a notification (e.g., from the vehicle analytics device 220, vehicle infotainment system 230, or other device) of a vehicle maintenance alert, safety alert, incoming call/text alert, navigation directions, etc.

The notification scoring module 650 may include a program module (e.g., program module 42 of FIG. 1) that scores a notification indicating its importance. In embodiments, the notification scoring module 650 may score a notification based on a set of scoring criteria that indicates the level of importance of the notification based on the attributes of the notification. For example, the notification scoring module 650 may score the notification based on the type of the notification, content of the notification (e.g., key words indicating the level of importance in the notification such as when the notification is a text), time from when the notification was originally received, whether the notification requires immediate attention, etc.

In embodiments, the notification scoring module 650 may also generate a score that indicates an expected amount of time to view the notification by the driver (e.g., a focus delay or "gaze time"). The notification scoring module 650 may determine the expected amount of time to view the notification based on environmental conditions, vehicle surroundings, historical viewing information, and/or preloaded or experimental data indicating an estimate for the focus delay or gaze-time.

The notification location criteria repository 660 may include a data storage device (e.g., storage system 34 of FIG. 1) that stores criteria indicating a location to place a notification based on at least one of: eye gaze direction/angle, focal point, focal plane, vehicle analytics, external data, driver information, notification type, notification score, etc. For example, the notification location criteria repository 660 may store criteria indicating that a notification should be displayed through a particular vehicle information display 210 (e.g., through a heads-up display, dashboard display infotainment display, etc.). Further, the notification location criteria repository 660 may store criteria indicating that the notification should be displayed at a particular position on a windshield through the heads-up display based on the driver's focal point, focal plane, importance of the notification, type of notification, etc.

As an illustrative example, the notification location criteria repository 660 may store criteria indicating that a notification of high importance (e.g., relating to an imminent vehicle malfunction or a notification having a greater than a threshold score) should be displayed through the heads-up display onto the windshield to a relatively close distance of the driver's focal point as to grab the driver's attention without blocking the driver's view of the road. As another example, the notification location criteria repository 660 may store criteria indicating that a notification of low importance (e.g., less than a threshold score) should be displayed through the heads-up display onto the windshield to a relatively far distance of the driver's focal point so as to less obstruct the driver's view. As another example, the notification location criteria repository 660 may store criteria indicating that a notification of low importance, while the vehicle is moving, and during hazardous whether/environmental conditions should not be displayed at all until the vehicle is stopped. As another example, the notification location criteria repository 660 may store criteria indicating that a notification should be displayed through the heads-up display onto the windshield to a relatively close distance of the driver's focal point when the notification is of a particular type and is expected to take longer than a threshold time to review (so as to minimize the driver's diversion from the road). In embodiments, the notification location criteria repository 660 may store any number and combination of criteria that specifies the location for where a notification should be displayed based on any combination of driver eye gaze direction, driver focus point/focus plane, vehicle analytics data, driver information, notification type, notification score, expected notification review time, environmental conditions, etc.

The notification location determination module 670 may include a program module (e.g., program module 42 of FIG. 1) that determines the location for where a notification (received by the notification receiving module 640) should be displayed. For example, the notification location determination module 670 may obtain the score of the notification from the notification scoring module 650, analyze the attributes of the notification (received by the notification receiving module 640), and compare the score, notification attributes, vehicle analytics information (received by the vehicle analytics monitoring module 630), external information, driver information, eye gaze direction (determined by the eye gaze monitoring module 610), focal point/focal plane information (determined by the focus plane determination module 620), and/or other information with the notification location criteria stored in the notification location criteria repository 660. Once the display location of the notification is determined based on the criteria, the notification location determination module 670 may generate and provide an instruction for the one or more vehicle information displays 210 to display the notification in accordance with the instructions (e.g., to display the notification within a dashboard display, infotainment display, and/or in a particular location on a windshield through a heads-up display, display the notification with a certain color, sound, animation, etc.). As described herein, the notification location determination module 670 may update the display location of a notification as the attributes of the notification change and/or as the conditions change (e.g., as the score of the notification changes and becomes more or less important, as whether conditions change, as the user's focal point changes, etc.). In embodiments, the notification location determination module 670 may discontinue the display of a notification based on driver instruction (e.g., voice command instruction, user input through the vehicle infotainment system 230, user input using dashboard buttons/commands, etc.).

Figure 7:
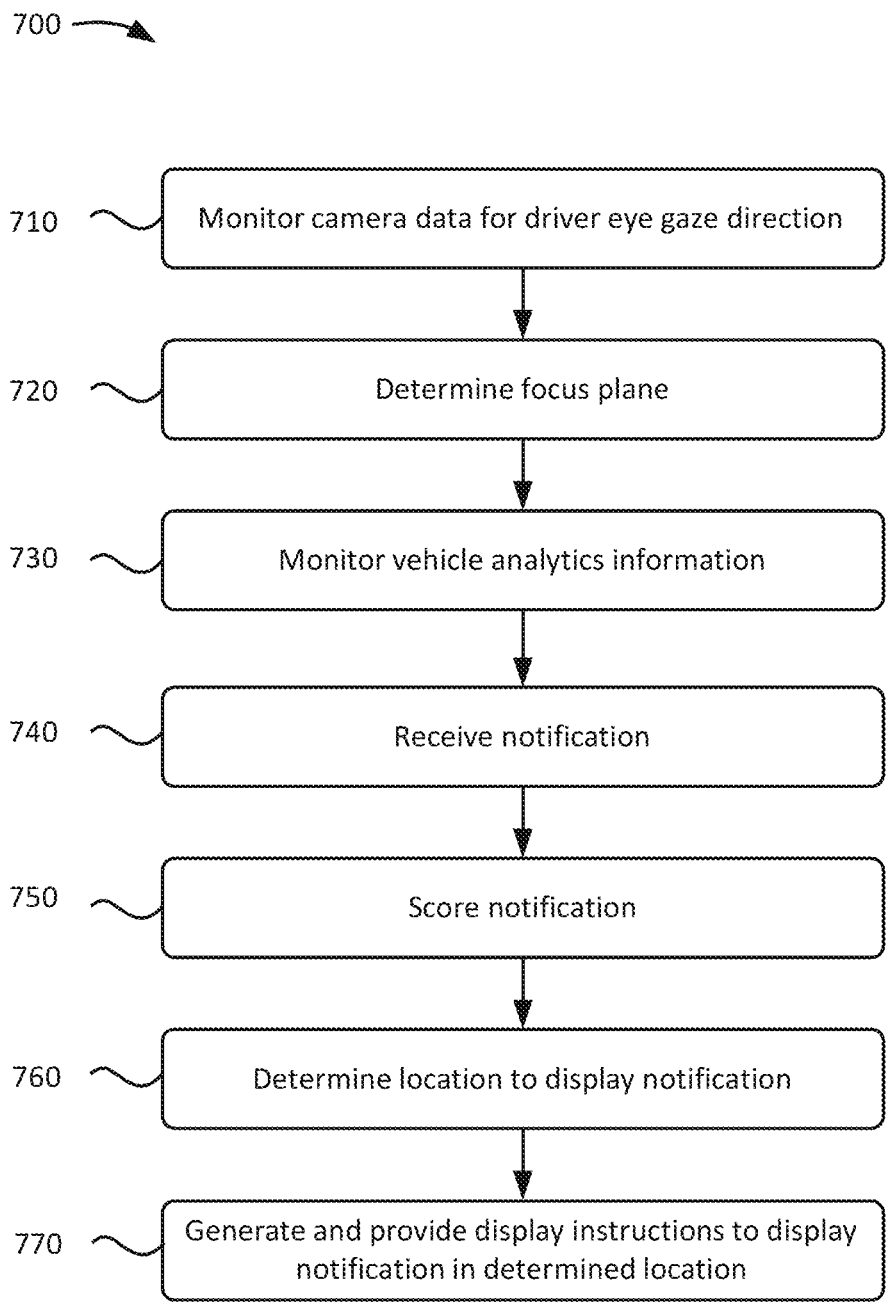
FIG. 7 shows an example flowchart of a process for determining the location to display a notification and displaying notification in the determined location.

FIG. 7 shows an example flowchart of a process for determining the location to display a notification and displaying notification in the determined location. The steps of FIG. 7 may be implemented in the environment of FIGS. 5 and 6, for example, and are described using reference numbers of elements depicted in FIGS. 5 and 6. As noted above, the flowchart illustrates the architecture, functionality, and operation of possible implementations of systems, methods, and computer program products according to various embodiments of the present invention.

As shown in FIG. 7, process 700 may include monitoring camera data for driver eye gaze direction (step 710). For example, as described above with respect to the eye gaze monitoring module 610, the notification display control device 260 may monitor a driver's eye gaze direction and angle based on image data received from one or more camera devices 240. In embodiments, the notification display control device 260 may implement image analysis techniques to recognize the driver's eyes and the direction and angle of their eye gaze.

Process 700 may also include determining a focus plane (step 720). For example, as described above with respect to the focus plane determination module 620, the notification display control device 260 may determine the focus plane of a driver. In embodiments, the notification display control device 260 may determine the focus plane based on the driver's eye gaze direction, angle, and focal point.

Process 700 may further include monitoring vehicle analytics data (step 730). For example, as described above with respect to the vehicle analytics monitoring module 630, the notification display control device 260 may monitor vehicle analytics data, such as vehicle speed, braking activity, turn signal activity, steering activity, vehicle maintenance status, etc.

Process 700 may also include receiving a notification (step 740). For example, as described above with respect to the notification receiving module 640, the notification display control device 260 may receive a notification (e.g., from the vehicle analytics device 220, vehicle infotainment system 230, or other device) of a vehicle maintenance alert, safety alert, incoming call/text alert, navigation directions, etc.

Process 700 may further include scoring the notification (step 750). For example, as described above with respect to the notification scoring module 650, the notification display control device 260 may score the notification from step 740 based on a set of scoring criteria that indicates the level of importance of the notification based on the attributes of the notification. In embodiments, the score may also indicate a diversion time.

Process 700 may also include determining the location to display the notification from, step 740 (step 760). For example, as described above with respect to the notification location determination module 670, the notification display control device 260 may determine and compare the score (determined at step 750), notification attributes, vehicle analytics information, external information, driver information, eye gaze direction, focal point/focal plane information, and/or other information with the notification location criteria stored in the notification location criteria repository 660.

Process 700 may further include generating and providing the display instructions to display the notification from step 740 in the determined location (step 770). For example, as described above with respect to the notification location determination module 670, the notification display control device 260 may generate and provide an instruction for the one or more vehicle information displays 210 to display the notification in accordance with the instructions (e.g., in a particular location on a windshield through a heads-up display, display the notification with a certain color, sound, animation, etc.). As described herein, the notification display control device 260 may update the display location of a notification as the attributes of the notification change and/or as the conditions change (e.g., as the score of the notification changes and becomes more or less important, as whether conditions change, as the user's focal point changes, etc.).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring, by a computing device, a driver's eye gaze direction;
   receiving, by the computing device, a first notification, the first notification being a first type of notification;
   determining, by the computing device, a location at which to display the first notification, the location being located a first distance relative to the driver's eye gaze direction;
   determining, by the computing device, a second distance relative to the driver's eye gaze direction at which a notification of a second type is to be displayed, the second type and the first type being different types of notifications; and
   generating, by the computing device, display instructions to display the first notification in the determined location,
   wherein the first distance and the second distance are different,
   the first type and the second type are selected from the group consisting of:
   vehicle malfunction;
   navigational direction;
   incoming text message; and
   incoming telephone call,
   the generating the display instructions further comprises determining that an expected duration of review of the first notification by the driver is longer than a threshold time to review, and
   the determining that the expected duration of review is longer than a threshold time to review is based on the first type of the first notification.

2. The method of claim 1, wherein the determining the location includes determining the location to display the first notification through a heads-up display device.

3. The method of claim 1, wherein the determining the location includes determining the location to display the first notification on to a windshield.

4. The method of claim 1, further comprising generating a score for the first notification, wherein the determining the location is further based on the score.

5. The method of claim 4, wherein the score indicates a level of importance of the first notification, the level of importance being determined based on the type of the notification, content of the notification including words indicating the level of importance in the notification, time from when the notification was originally received, and whether the notification requires immediate attention.

6. The method of claim 4, wherein the score indicates the expected duration of review of the first notification, the expected duration of review of the first notification being based on environmental conditions, and preloaded data indicating an estimate for focus delay.

7. The method of claim 1, further comprising generating updated display instructions based on a change to the user's eye gaze direction, the change in the user's eye gaze direction being detected by a camera device.

8. The method of claim 1, wherein a service provider at least one of creates, maintains, deploys and supports the computing device.

9. The method of claim 1, wherein the monitoring the eye gaze direction, the receiving the first notification, the determining the location to display the first notification, and the generating the display instructions are provided by a service provider on a subscription, advertising, and/or fee basis.

10. The method of claim 1, wherein the computing device includes software provided as a service in a cloud environment.

11. The method of claim 1, further comprising deploying a system for displaying a vehicle notification in a location determined based on driver eye gaze direction and driver action required to act on the notification, the deploying comprising providing a computer infrastructure operable to perform the monitoring the eye gaze direction, the receiving the first notification, the determining the location at which to display the first notification, and the generating the display instructions.

12. A computer program product for displaying a first vehicle notification in a location determined based on driver eye gaze direction, the computer program product comprising a computer readable storage medium having program instructions embodied therewith, the program instructions executable by a computing device to cause the computing device to:
monitor a driver's eye gaze direction;
receive the first vehicle notification;
determine a diversion time for the driver to review the first vehicle notification based on the first vehicle notification being a first type of notification;
determine that the diversion time is longer than a threshold time to review based on the first vehicle notification being the first type of notification;
determine a location to display the first vehicle notification based on the diversion time, the location being located a first distance relative to the driver's eye gaze direction;
determine a second distance relative to the driver's eye gaze direction at which a notification of a second type is to be displayed, the second type and the first type being different types of notifications; and
display the first vehicle notification in the determined location,
wherein the first distance and the second distance are different,
the first type and the second type are selected from the group consisting of:
vehicle malfunction;
navigational direction;
incoming text message; and
incoming telephone call.

13. The computer program product of claim 12, wherein the location includes at least one selected from the group consisting of:
a heads-up display;
a dashboard display;
an infotainment system display.

14. The computer program product of claim 12, wherein the location includes a location on a windshield, wherein the first vehicle notification is displayed through a heads-up display projecting the first vehicle notification on the windshield at the location on the windshield.

15. The computer program product of claim 12, wherein the program instructions further cause the computing device to generate a score for the first vehicle notification, wherein the determining the location is further based on the score.

16. The computer program product of claim 15, wherein the score indicates a level of importance of the first vehicle notification.

17. A system comprising:
a CPU, a computer readable memory and a computer readable storage medium associated with a computing device;
program instructions to monitor a driver's eye gaze direction;
program instructions to determine a focal point of the driver based on the eye gaze direction;
program instructions to receive a first vehicle notification;
program instructions to receive a second vehicle notification;
program instructions to determine a first diversion time for the driver to review the first vehicle notification based on the first vehicle notification being a first type of notification;
program instructions to determine a second diversion time for the driver to review the second vehicle notification based on the second vehicle notification being a second type of notification, the second type and the first type being different types of notifications;
program instructions to determine a first location to display the first vehicle notification based on the first diversion time, the first location being located a first distance relative to the driver's eye gaze direction;
program instructions to determine a second location to display the second vehicle notification based on the second diversion time, the second location being located a second distance relative to the driver's eye gaze direction;
program instructions to generate display instructions to display the first vehicle notification in the determined first location, the generating the display instructions comprising determining that the first diversion time is longer than a threshold time to review; and
program instructions to display the first vehicle notification in the determined first location,
wherein the first distance and the second distance are different,
the first type and the second type are selected from the group consisting of:
vehicle malfunction;
navigational direction;
incoming text message; and
incoming telephone call,
the determining that the first diversion time is longer than a threshold time to review is based on the first type of the first notification, and
the program instructions are stored on the computer readable storage medium for execution by the CPU via the computer readable memory.

18. The system of claim 17, wherein the first location includes at least one selected from the group consisting of:
a heads-up display;
a dashboard display; and
an infotainment system display.

* * * * *